US008556323B2

United States Patent
Hoge et al.

(10) Patent No.: US 8,556,323 B2
(45) Date of Patent: Oct. 15, 2013

(54) MOTOR VEHICLE SEAT

(75) Inventors: Ralf Hoge, Radevormwald (DE); Karim El Benaye, Hösbach (DE); Lip-Min Ng, Leverkusen (DE); Matthew Cooper, Kleinostheim (DE); Johan Skrabala, Wuerzburg (DE)

(73) Assignee: Magna Seating (Germany) GmbH, Sailauf (DE)

( * ) Notice: Subject to any disclaimer, the term of this patent is extended or adjusted under 35 U.S.C. 154(b) by 272 days.

(21) Appl. No.: 12/746,361

(22) PCT Filed: Nov. 27, 2008

(86) PCT No.: PCT/DE2008/001969
§ 371 (c)(1),
(2), (4) Date: Aug. 17, 2010

(87) PCT Pub. No.: WO2009/071055
PCT Pub. Date: Jun. 11, 2009

(65) Prior Publication Data
US 2010/0308619 A1  Dec. 9, 2010

(30) Foreign Application Priority Data

Dec. 5, 2007  (DE) .......................... 10 2007 063 565
Dec. 14, 2007 (DE) .......................... 10 2007 060 934
Jan. 28, 2008  (DE) .......................... 10 2008 006 425

(51) Int. Cl.
*B60N 2/02* (2006.01)

(52) U.S. Cl.
USPC ..................... 296/65.13; 296/65.05; 297/334

(58) Field of Classification Search
USPC .............................. 296/65.13, 65.05; 297/334
See application file for complete search history.

(56) References Cited

U.S. PATENT DOCUMENTS

| 6,196,613 | B1 * | 3/2001 | Arai ........................... 296/65.13 |
| 2002/0027383 | A1 | 3/2002 | Tsuda et al. | |

FOREIGN PATENT DOCUMENTS

| WO | 9854024 A1 | 12/1998 |
| WO | 2006017933 A1 | 2/2006 |

* cited by examiner

*Primary Examiner* — Joseph Pape
(74) *Attorney, Agent, or Firm* — Miller Canfield

(57) ABSTRACT

A folding seat arrangement comprising a first carrying structure (2) having a backrest (3) and guiding elements (11) for the removable attachment in guide rails (9) to a vehicle floor, a second carrying structure (5) pivotally mounted to the first carrying structure (2) and having a seat cushion (4), and a supporting structure (6; 31), on which in a first end region guiding elements (10) are provided for the removable attachment in guide rails (9) and which in a second region is mounted a carrying structure (2; 5) in an articulated manner such that the seat arrangement in the folded setting requires the least amount of space in the lower region of the expanded luggage compartment. This is achieved in that the guiding elements (11) on the first carrying structure (2) and the supporting structure (6; 31) can be moved relative to one another to pivot the supporting structure (6; 31).

6 Claims, 9 Drawing Sheets

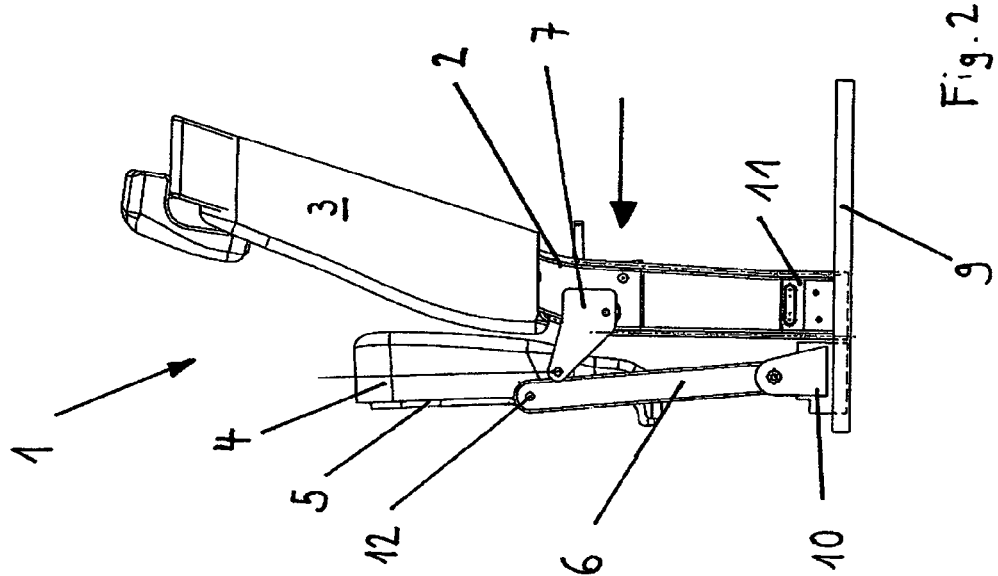
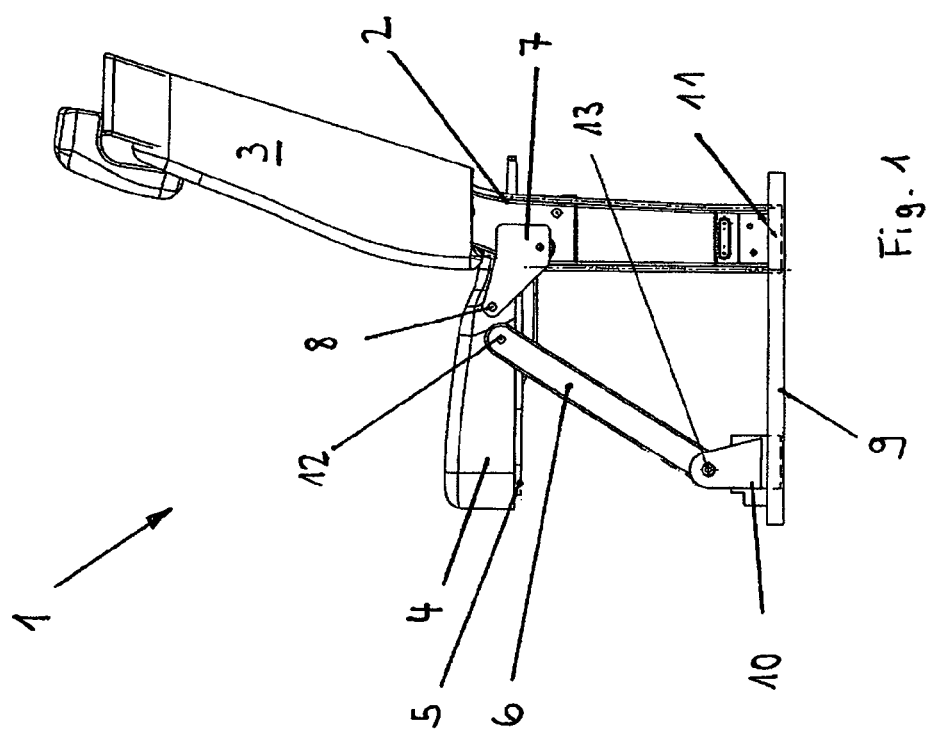

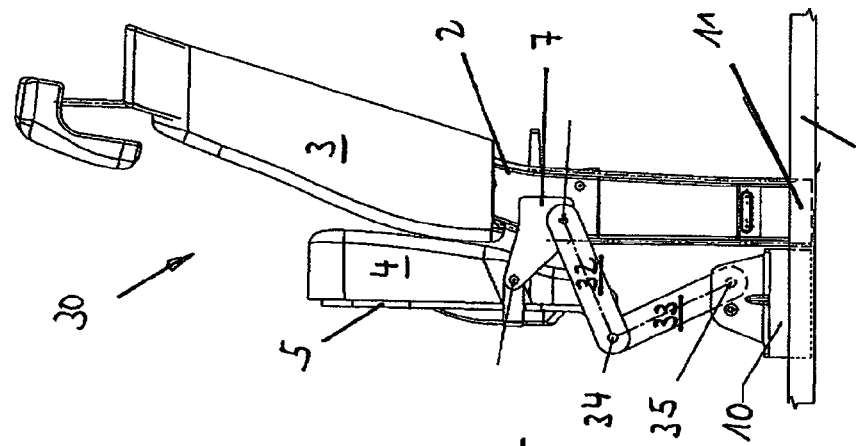
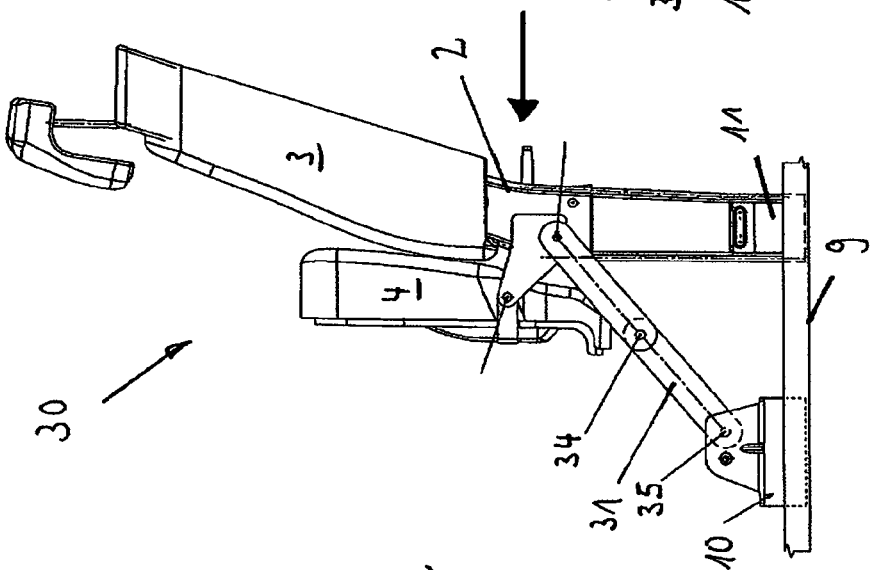
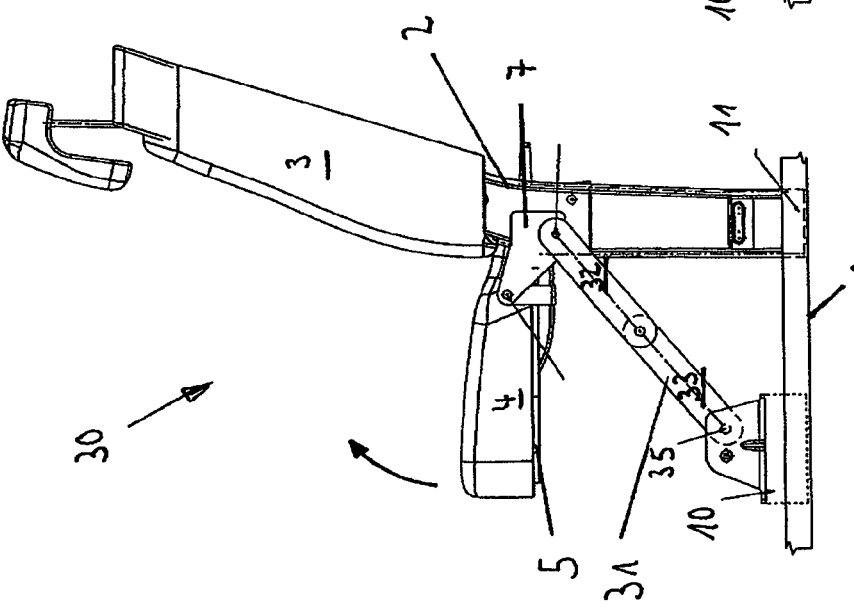

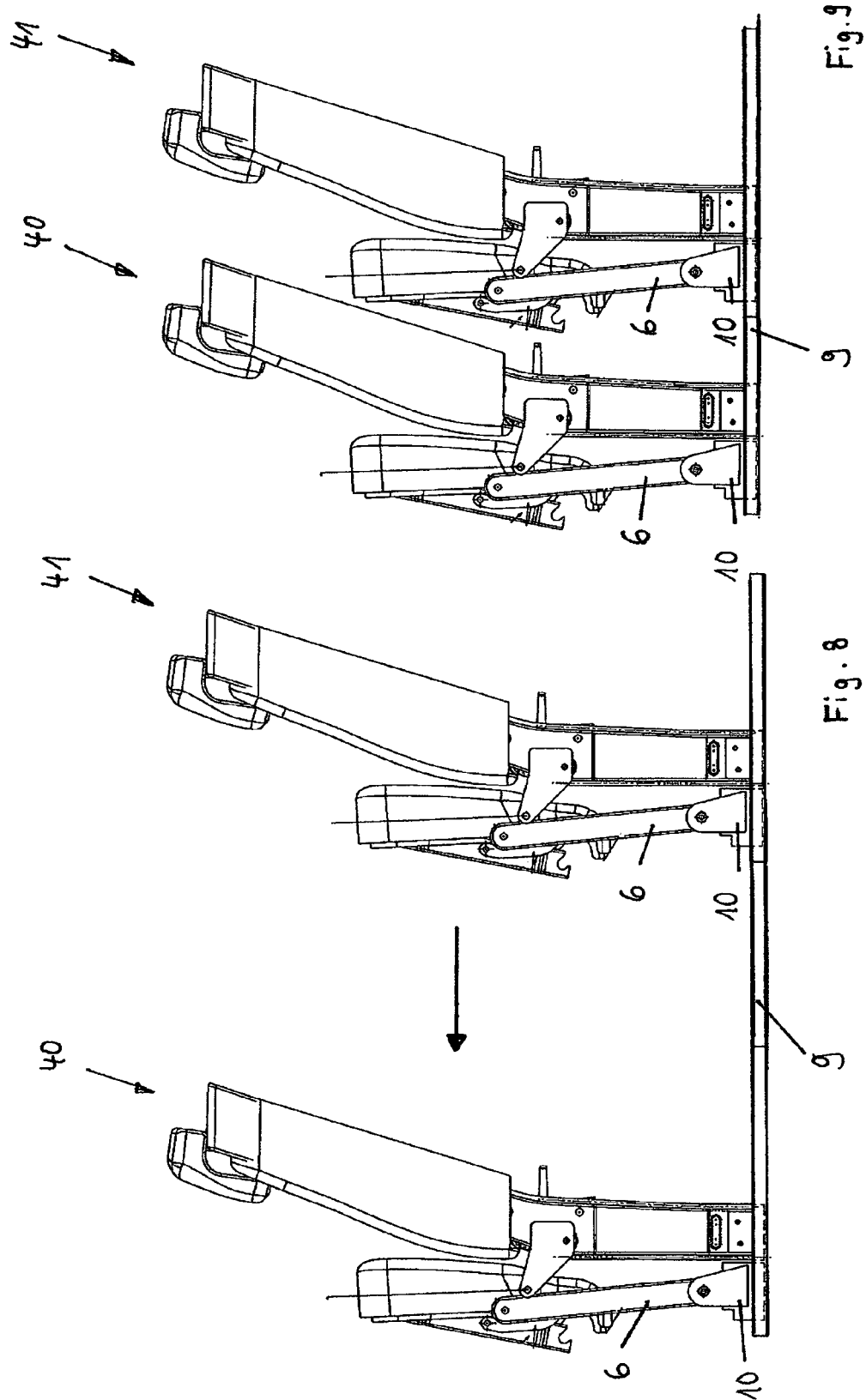

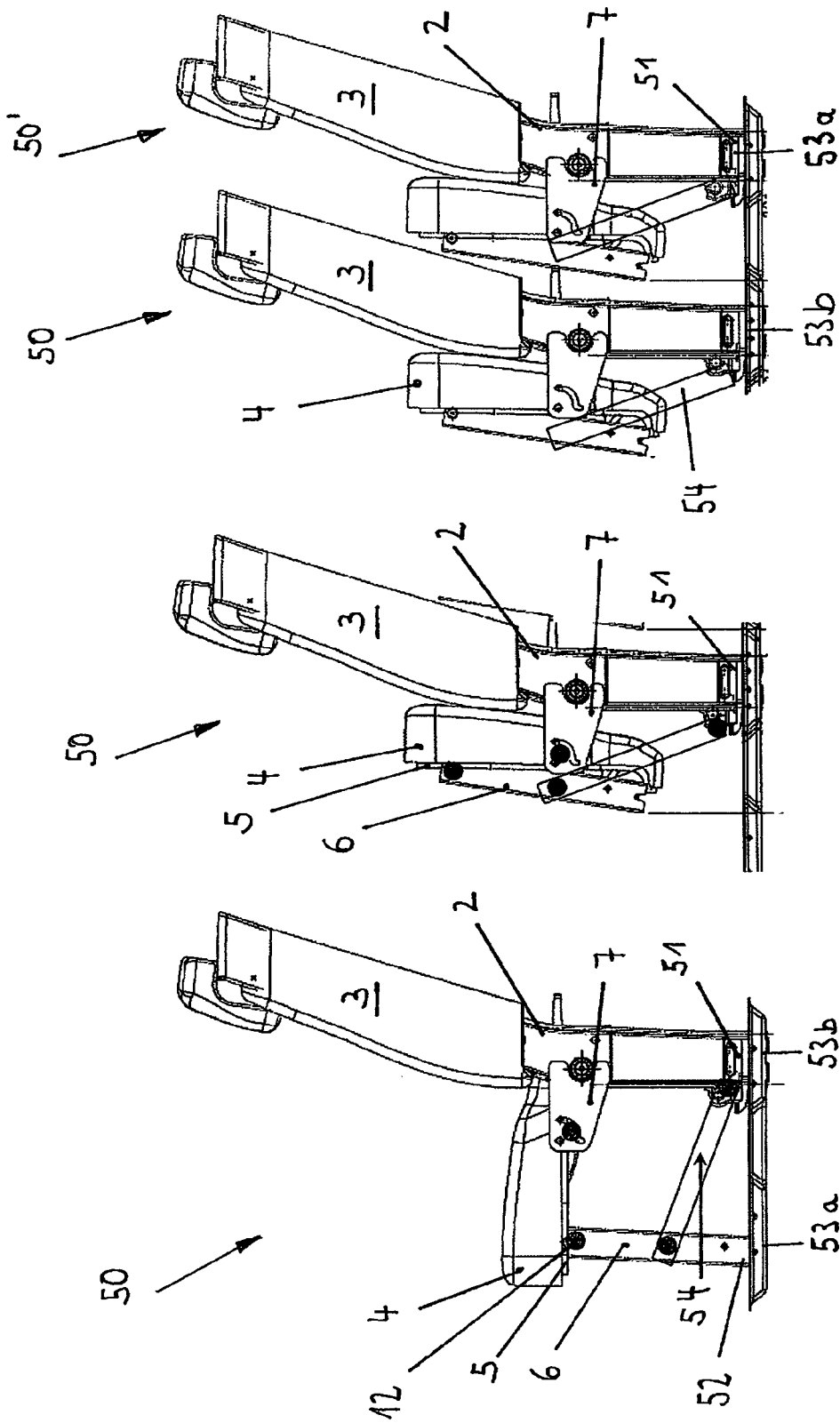

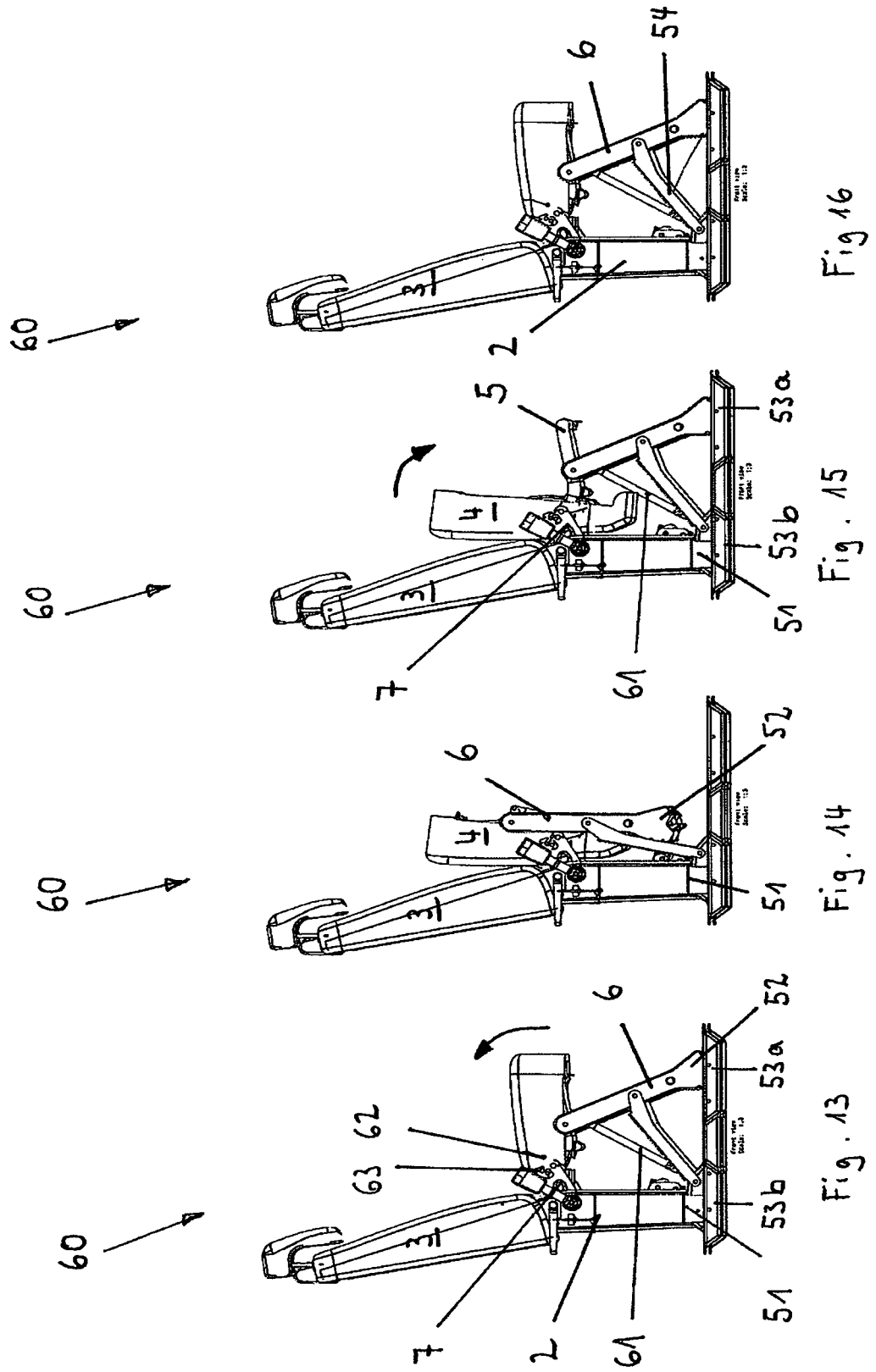

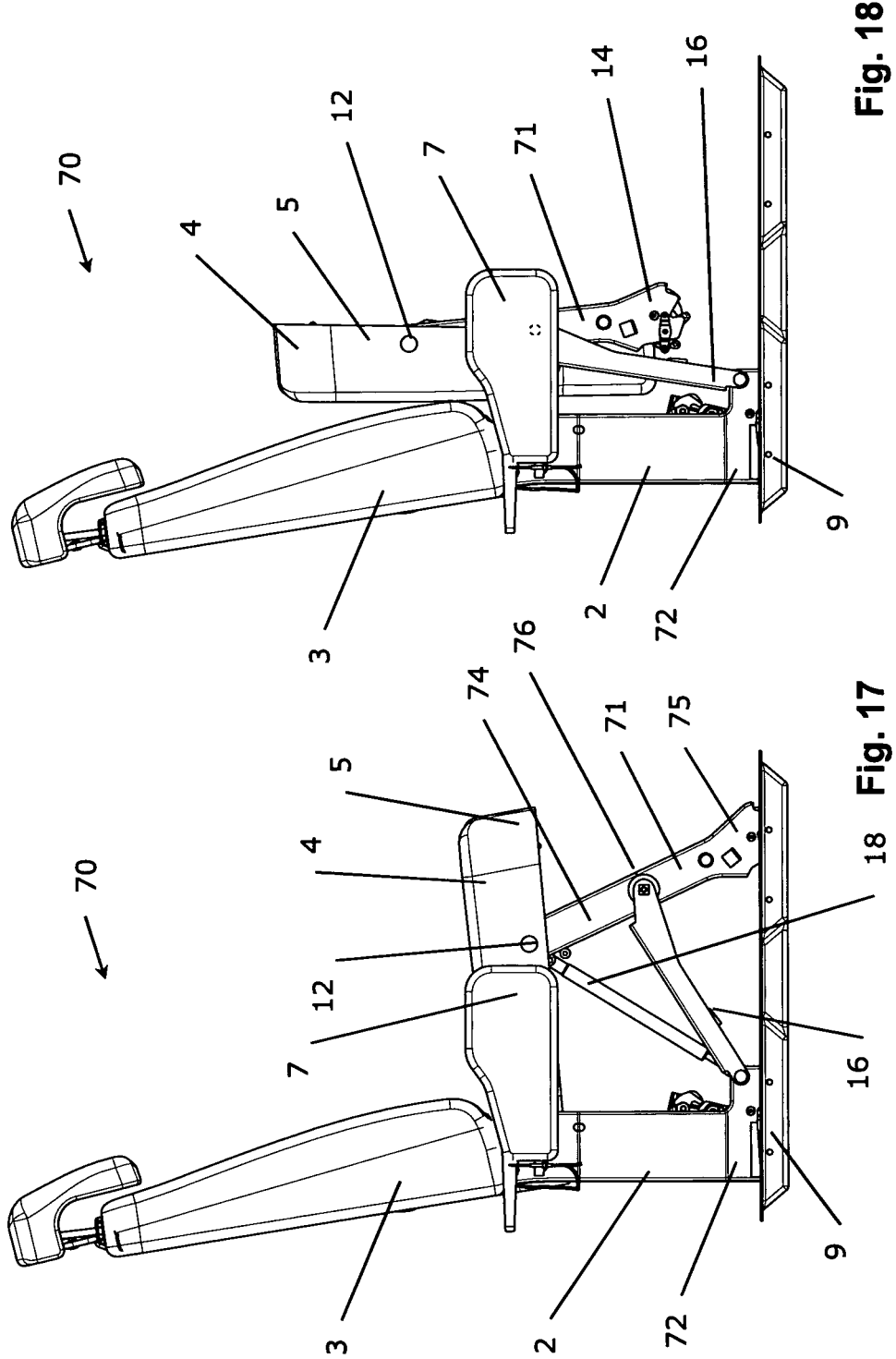

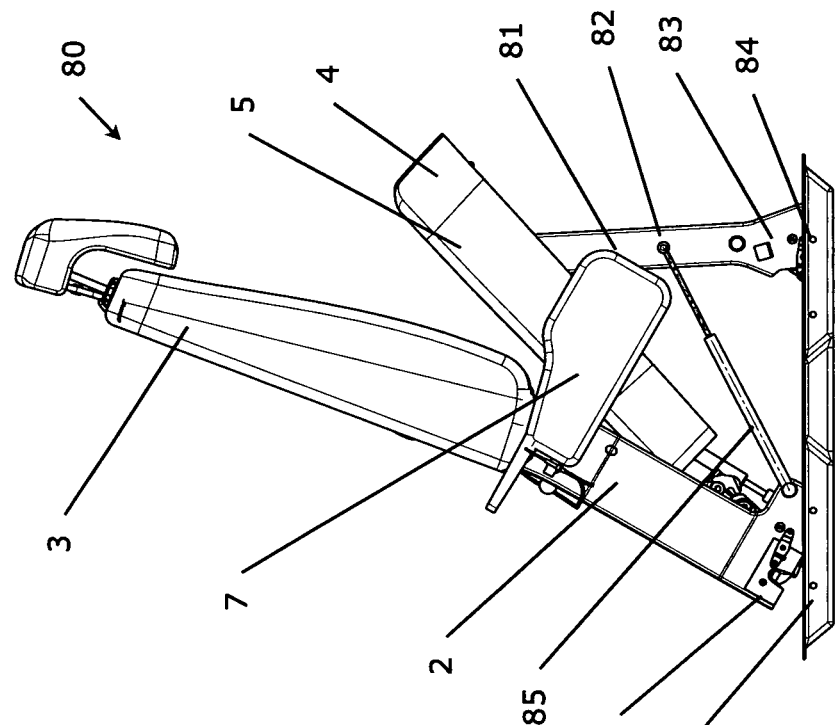
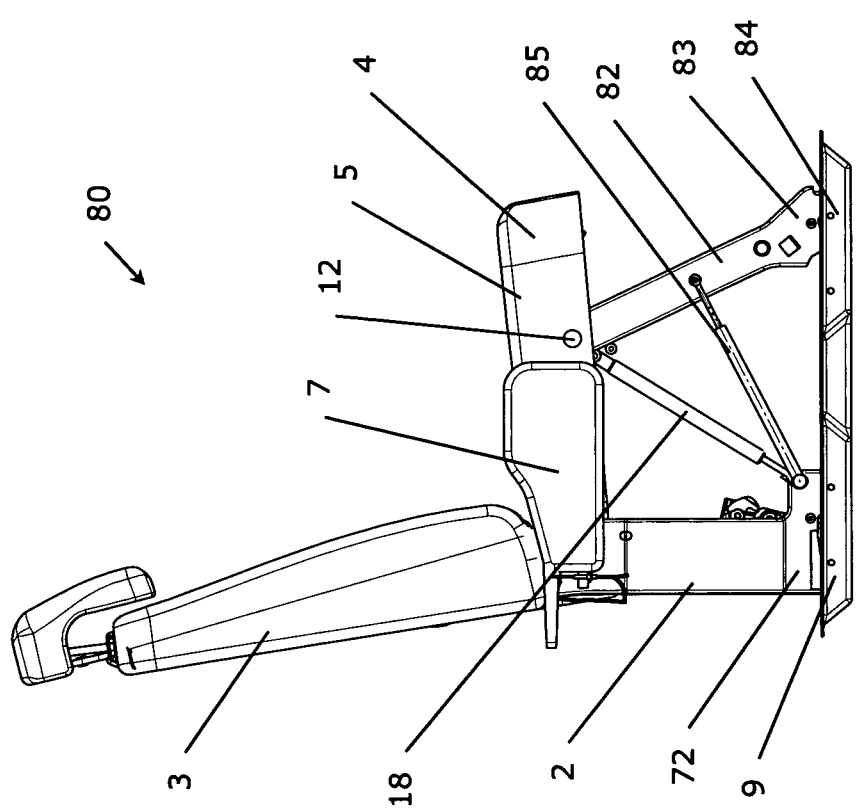

MOTOR VEHICLE SEAT

CROSS-REFERENCE TO RELATED APPLICATIONS

This application claims priority from German Patent Application Ser. No. 102007063565.8 filed on Dec. 5, 2007, German Patent Application Serial No. 102007060934.7, filed Dec. 14, 2007 and German Patent Application Serial No. 102008006425.4, filed Jan. 28, 2008, the disclosures of which are incorporated herein by reference for all purposes.

FIELD OF THE INVENTION

The present invention relates to a folding seat arrangement for a motor vehicle and in particular for a minibus or van.

BACKGROUND OF THE INVENTION

In station wagons, minibuses or vans, the second seat row is frequently designed in a manner such that it can be folded. As a result, a simple enlargement of the luggage compartment is possible without removal of the seat row. For example, a seat arrangement of this type is shown in the publication US 2002/0027383 A1. In general, when the seat row is folded, the backrest is laid over the seat surface and the entire seat is subsequently positioned forward in the front region of the seat base via a pivot axis. However, when folding in said manner, a step is produced in the expanded luggage compartment, as a result of which the portion of the luggage compartment floor which is usable in the longitudinal direction of the vehicle is considerably shortened. In addition, the seats of the first seat row have to be protected against luggage being hurled around by an additional luggage compartment partition.

DE 10 2005 002 916 A1 discloses a seat arrangement in which the vehicle seat is held in a manner such that it can be displaced via the floor support thereof along the vehicle floor such that it can be retained in any position. The seat can be displaced from a use position into a storage position in which the backrest and the seat surface form a common vertical plane. The design of a vertical vehicle compartment separating means of this type requires little space in the longitudinal direction of the vehicle, but a free view to the rear through the rear window is no longer possible.

Furthermore, seat arrangements which can be displaced forward are known, in which the backrest is folded forward in order to facilitate entry to a rear seat row. In very confined space conditions, a forward movement of the seat arrangement along the floor rails is additionally also provided. Seat arrangements of this type are known, for example, from U.S. Pat. No. 6,799,800 B2 and WO 2006/017933.

SUMMARY OF THE INVENTION

It is therefore an object of the present invention to provide a folding seat arrangement which has an improved functional diversity and which, in the folded setting (storage setting), takes up as little space as possible in the lower region of the expanded luggage compartment, but still permits a free view through the rear window.

In a preferred embodiment of the seat arrangement, means for coupling the displacement movement between the first carrying structure and the vehicle body to the pivoting movement between the seat cushion and the backrest are provided. It is therefore unnecessary for the user to have to manually pivot the seat cushion into a vertical position when folding the seat arrangement.

Other advantageous refinements of the present invention are specified in the respective dependent claims.

BRIEF DESCRIPTION OF THE DRAWINGS

Preferred embodiments of the present invention are described below by way of example, with reference being made to the appended drawings, in which:

FIG. 1 shows a perspective schematic side view of a folding seat arrangement according to the present invention in the use setting;

FIG. 2 shows a perspective schematic side view of the folding seat arrangement according to FIG. 1 in the storage setting;

FIG. 5 shows a perspective schematic side view of a further alternative embodiment of a folding seat arrangement according to the present invention in the use setting;

FIG. 6 shows a perspective schematic side view of the further alternative embodiment of the folding seat arrangement according to FIG. 5 in an intermediate setting;

FIG. 7 shows a perspective schematic side view of the further alternative embodiment of the folding seat arrangement according to FIG. 5 in the storage setting;

FIG. 8 shows a perspective schematic side view of folding seat arrangements of the second and third seat row according to the present invention in a storage setting of the two seat arrangements;

FIG. 9 shows a perspective schematic side view of the folding seat arrangement according to FIG. 8 in a pushed-together position of the two seat arrangements, FIG. 10 shows a perspective schematic side view of yet another alternative embodiment of a folding seat arrangement according to the present invention in the use setting;

FIG. 11 shows a perspective schematic side view of yet another alternative embodiment of the folding seat arrangement according to FIG. 10 in the storage setting, FIG. 12 shows a perspective schematic side view of folding seat arrangements of the second and third seat row according to FIG. 10 in the storage setting of the two seat arrangements, FIG. 13 shows a perspective schematic side view of a folding seat arrangement with an additional safety device in the use setting, FIG. 14 shows a perspective schematic side view of a folding seat arrangement with an additional safety device according to FIG. 13 in the storage setting;

FIG. 15 shows a perspective schematic side view of a folding seat arrangement with an additional safety device according to FIG. 13 in an intermediate setting, FIG. 16 shows a perspective schematic side view of a folding seat arrangement with an additional safety device according to FIG. 13 in the completely folded-back use setting, FIG. 17 shows a perspective schematic side view of a further refinement of a folding seat arrangement according to the present invention in the use setting, FIG. 18 shows a perspective schematic side view of the folding seat arrangement according to FIG. 17 in the storage setting, FIG. 20 shows a perspective schematic side view of yet another refinement of an alternative embodiment of a folding seat arrangement according to the present invention in the use setting; and FIG. 21 shows a perspective schematic side view of the alternative embodiment of the folding seat arrangement according to FIG. 20 in the entry setting.

DETAILED DESCRIPTION OF THE PREFERRED EMBODIMENTS

Figure 4:
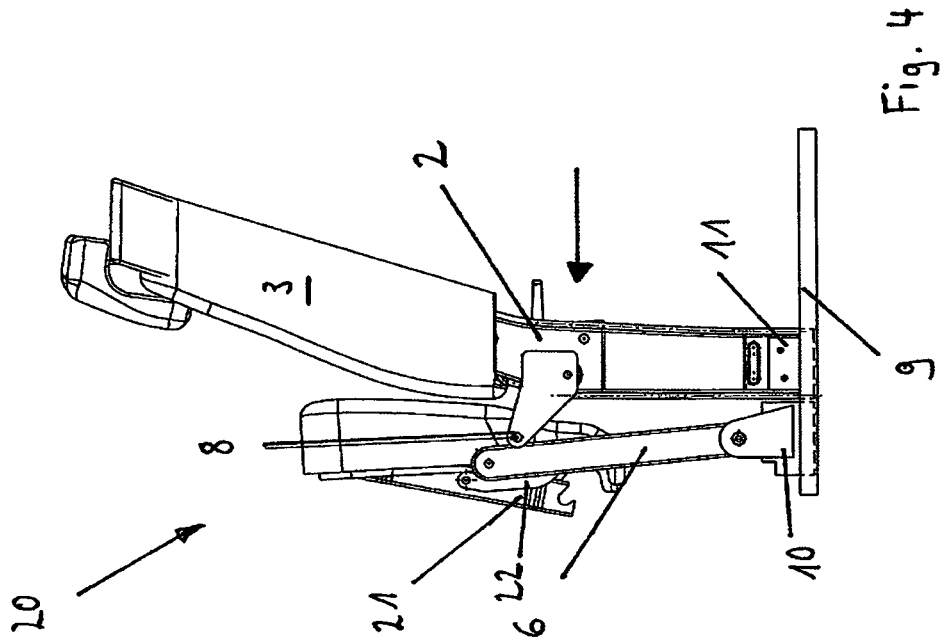
FIG. 4 shows a perspective schematic side view of the alternative embodiment of the folding seat arrangement according to FIG. 3 in the storage setting.

FIGS. 1 and 2 show a folding seat arrangement 1 in different settings. The folding seat arrangement 1 comprises a first carrying structure 2 with a backrest arranged thereon, a seat cushion 4 with seat upholstery and an associated second carrying structure 5, and with a floor support which comprises a supporting structure 6.

The second carrying structure 5 assigned to the seat cushion 4 extends substantially within the seat cushion 4 and gives the latter the stability required for use. The first carrying structure 2 is assigned to the backrest 3 in order to carry and mechanically stiffen the backrest upholstery. The second carrying structure 5 with the seat cushion 4 is fastened pivotably in the rear region to the backrest 3. In the embodiment shown, said pivotable connection 8 exists in particular between a point of the above-described second carrying structure 5, which point is located in the rear region or in the central region, and on side members 7 connected to the first carrying structure 2. The side members 7 are designed as plate-like elements which are fastened laterally to the first carrying structure 2. The first carrying structure 2 continues downward beyond the backrest 3 and essentially consists of supporting struts which are arranged spaced apart in the transverse direction, run parallel and extend in the plane of the backrest 3. The supporting struts are connected at the lower end region to sliding or guide elements 11 which are mounted in a longitudinally displaceable manner in the guide rails 9. The sliding or guide elements 11 can be retained in the guide rails 9 via locking means (not illustrated).

The supporting structure 6 consists of two supporting struts which are arranged at a distance in the transverse direction and run parallel to each other. The supporting struts are coupled pivotably at the first end region thereof to the second carrying structure 5 via an articulated arrangement 12. In the embodiment shown, said pivotable connection is in particular arranged in the region upstream of the pivotable connection 8 between the seat cushion and backrest on the second carrying structure 5 and the first end region of the supporting strut 6. The second end region of the supporting struts of the supporting structure 6 is coupled pivotably via an articulated arrangement 13 to sliding or guide elements 10. The sliding or guide elements 10 are guided in a sliding manner in the guide rails 9 and can be retained in any position along the guide rails 9 via locking means.

In the use setting shown in FIG. 1, the supporting struts which run parallel to each other are aligned such that they point diagonally downward in the direction of travel from an approximately central to rear side region of the seat cushion.

The seat arrangement 1 can be transferred from the use setting into the storage setting shown in FIG. 2 as follows. First of all, the retention of the sliding or guide elements 11, which are assigned to the first carrying structure 2, in the region of the guide rails 9 is released. The supporting structure 6 continues to be retained in the guide rails 9 in the position illustrated via the sliding or guide elements 10. The first carrying structure 2 is subsequently displaced forward in the direction of travel along the guide rails 9 (direction of displacement illustrated by an arrow).

By the supporting structure 6 being retained in the guide rails 9, when the first carrying structure 2 is displaced the distance of the sliding or guide elements 11 arranged thereon from the sliding or guide elements 10 of the supporting structure 6 is reduced. In the process, the first carrying structure 2 is displaced into the position which is shown in FIG. 2 and in which the sliding or guide elements 11 come to bear against the sliding or guide elements 10. When the first carrying structure 2 is displaced, the above-described arrangement of the supporting structure 6 at the same time causes the seat cushion 4 to be forcibly guided upward by pivoting into a vertical position.

Figure 3:
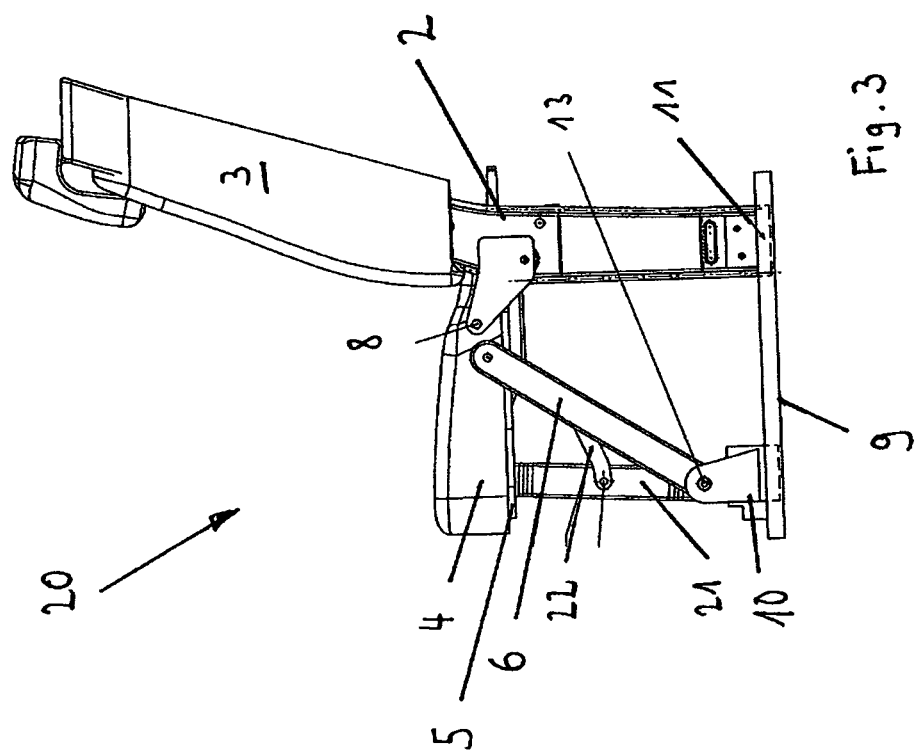
FIG. 3 shows a perspective schematic side view of an alternative embodiment of a folding seat arrangement according to the present invention in the use setting.

The folding seat arrangement 20 shown in the different settings in FIGS. 3 and 4 differs from the embodiment described with regard to FIGS. 1 and 2 by means of the arrangement of a second supporting structure 21 which has a number of further supporting struts. Said number of further supporting struts is preferably connected to the second carrying structure 5 in the front lower region of the seat cushion 4, the supporting struts expediently being aligned at approximately a right angle or at a slight inclination in relation to the plane of the bearing surface of the seat upholstery. The further supporting struts serve to additionally support the folding seat arrangement 20 on a vehicle body.

For this purpose, the supporting struts are fastened at the first end region thereof to the second carrying structure in a manner such that they can pivot transversely with respect to the seat direction which, in the present case, coincides with the longitudinal direction of the vehicle. At the second end region thereof, the supporting struts are connected releasably to the sliding or guide elements 10. In the exemplary embodiment illustrated, the releasable connection is brought about by means of latching hooks which are arranged on the end sides of the supporting struts and engage around a bolt arranged in the sliding or guide element 10.

A forcibly guided pivoting of the supporting struts of the second supporting structure 21 upward into the vertical alignment (shown in FIG. 4) of the supporting struts, and unlatching of the latching hook from the sliding or guide element 10 upon transfer of the seat arrangement 20 into the storage setting and latching of the latching hook onto the sliding or guide element 10 when the seat arrangement 20 is set back into the use setting are brought about via a coupling element 22. For this purpose, the coupling element 22 in the form of a lever of angled design is fastened pivotably at one end thereof in the central region of the supporting strut of the second supporting structure 21 and at the other end thereof at the upper region of the supporting structure 6.

In contrast to the above-described embodiments, in the case of the folding seat arrangement 30 shown in the different settings in FIGS. 5, 6 and 7, means which bring about a coupling of the displacement movement between the first carrying structure and the vehicle body to the pivoting movement between the seat cushion and the backrest are not provided.

The folding seat arrangement 30 comprises a first carrying structure 2 with a backrest 3 arranged thereon, a seat cushion 4 with seat upholstery and an associated second carrying structure 5, and a floor support which comprises a supporting structure 6.

The second carrying structure 5 assigned to the seat cushion 4 extends substantially within the seat cushion 4 and gives the latter the stability required for use. The first carrying structure 2 is assigned to the backrest 3 in order to carry and mechanically stiffen the backrest upholstery. The second carrying structure 5 with the seat cushion 4 is fastened pivotably in the rear region to the backrest 3. In the embodiment shown, said pivotable connection 8 exists in particular between a point of the above-described second carrying structure 5, which point is located in the rear region or in the central region, and on side members 7 connected to the first carrying structure 2. The side members 7 are designed as plate-like elements which are fastened laterally to the first carrying structure 2. The first carrying structure 2 continues downward beyond the backrest 3 and essentially consists of supporting struts which are arranged spaced apart in the transverse direction, run parallel and extend in the plane of the backrest 3. The supporting struts are connected at the lower end region to sliding or guide elements 11 which are mounted in a longitudinally displaceable manner in the guide rails 9.

Furthermore, a supporting structure 31 is provided, said supporting structure consisting of two toggle joint arrangements arranged parallel to each other. The toggle joint arrangement comprises two articulated levers 32, 33 which are connected pivotably to each other at the mutually facing end regions thereof via a joint 34. The other end region of the first lever 32 is fastened pivotably to the side member connected to the first carrying structure 2. The second lever 33 is fastened pivotably by the other end region thereof via an articulated arrangement 35 to the sliding or guide element 10.

In the use setting shown in FIG. 5, the two articulated levers 32, 33 form a supporting strut which points diagonally downward in the direction of travel. The seat cushion 4 is aligned horizontally.

The seat arrangement 30 can now be transferred from the use setting into the storage setting shown in FIG. 7 in a first step by manual pivoting of the seat cushion 4 upward into the vertical alignment (shown in FIG. 6) of the seat cushion 4. The retention of the sliding or guide elements 11 of the first carrying structure 2 in the guide rails 9 is subsequently released and the seat arrangement 30 is displaced in the guide rails 9, as illustrated by the arrow.

By the sliding or guide elements 10 being retained in the guide rails 9, when the first carrying structure 2 and the sliding or guide elements 11 arranged thereon are displaced, the distance of the sliding or guide elements 11 of the first carrying structure from the sliding or guide elements 10 of the supporting structure 31 is reduced. The first carrying structure 2 is displaced into the position which is shown in FIG. 7 and in which the sliding or guide elements 11 of the first carrying structure 2 come to bear against the sliding or guide elements 10 of the supporting structure. When the first supporting structure 2 is displaced, the two levers 32, 33 are pivoted into an angled arrangement by means of the above-described arrangement and configuration of the toggle lever arrangement.

The carrying structures and the supporting structures of the above-described folding seat arrangement are preferably designed in the manner of a frame or framework. The possibility of advantageous production arises with the use of suitably bent metal tubes which are connected to one another and to adjoining fittings, in particular joints and locks, via bushings or welds.

A core consisting of a foamed elastic plastics material, such as, for example, polyurethane, which is provided with a durable cover made of fabric material, or synthetic or natural leather, is customarily provided as the upholstery for the above-described folding seat arrangement.

For a folding seat arrangement with an individual seat, two edge supporting struts are preferably provided on the seat cushion in the rear and front end regions of the seat cushion. In the case of a folding seat arrangement having a plurality of seats, further supporting struts running parallel and located in between are preferably provided in order to avoid sagging of the seat cushion.

FIG. 8 shows, in a perspective illustration, a seat arrangement 40 of the second seat row in a storage setting, and a seat arrangement 41, which is arranged therebehind, of the third seat row in the storage setting. In order to enlarge the luggage compartment, the retention of the sliding or guide elements 10 of the supporting structure 6 in the guide rails 9 is released and, as illustrated by the arrow, the folded seat arrangement 41 of the third seat row is displaced along the rail arrangement onto the rear side of the backrest 3 of the seat arrangement 40 of the second seat row.

The folding seat arrangement can be designed in such a manner that it has a carrying structure and supporting structure, with sliding or guide elements 10, 11 which are located one behind another in pairs in the longitudinal direction and on which undoable locking means for the releasable and/or removable securing in guide rails 9 on the floor of the motor vehicle interior are arranged. The carrying structure and supporting structure can be folded for storage in the longitudinal direction by the sliding or guide elements 10, 11 being converged in pairs, wherein the locking means are set up to interact in pairs upon convergence of said elements in order, by means of the movement of an unlocked locking means, to undo the locking of the associated locking means.

FIGS. 10, 11 and 12 show yet another embodiment of a folding seat arrangement 50 in different settings. The folding seat arrangement 50 comprises a first carrying structure 2 with a backrest 3 arranged thereon, a seat cushion 4 with seat upholstery and an associated second carrying structure 5, and a floor support which comprises a supporting structure 6.

The second carrying structure 5 which is assigned to the seat cushion 4 extends essentially within the seat cushion 4 and gives the latter the stability required for use. The first carrying structure 2 is assigned to the backrest 3 in order to carry and mechanically stiffen the backrest upholstery. The second carrying structure 5 together with the seat cushion 4 is fastened pivotably in the rear region to the backrest 3. In the embodiment shown, said pivotable connection 8 exists in particular between a point of the above-described second carrying structure 5, which point is located in the rear region or in the central region, and on side members 7 connected to the first carrying structure 2. The side members 7 are configured as plate-like elements which are fastened laterally to the first carrying structure 2. The first carrying structure 2 continues downward beyond the backrest 3 and essentially consists of supporting struts which are arranged at a distance in the transverse direction, run parallel and extend in the plane of the backrest 3. At the lower end region, the supporting struts each have a connecting section 51 which comprises locking and unlocking elements. The first carrying structure 2 can be secured at fastening sections 53b on the floor of the motor vehicle via the connecting sections (not illustrated specifically). The locking and unlocking means are preferably designed as locks which comprise a rotary latch and an associated pawl arrangement. In this case, the releasable locking of the first carrying structure 2 is produced in a known manner by interaction of the locking latch with a locking member, namely a transverse bolt, arranged on the fastening section.

The supporting structure 6 consists of two supporting struts which are arranged at a distance in the transverse direction and run parallel to each other. The supporting struts are expediently aligned at approximately a right angle or with a slight inclination in relation to the plane of the bearing surface of the seat cushion. The supporting struts are coupled pivotably at the first end region thereof to the second carrying structure 5 via an articulated arrangement 12. In the embodiment shown, said pivotable connection is arranged in particular in the front end region of the second carrying structure 5 and the first end region of the supporting strut 6. The second end region of the supporting struts of the supporting structure 6 is secured releasably on fastening sections 53a on the floor of the motor vehicle via a connecting section 52 which comprises locking and unlocking means. The releasable locking of the supporting structure 6 is brought about in a known manner, as already described above with respect to the releasable securing of the carrying structure 2, by interaction of a locking latch with a locking member, namely a transverse bolt, arranged on the fastening section. Of course, other locking means/unlocking means may also be provided.

It is apparent from FIGS. 10-12 that a coupling element 54 is additionally provided. Said coupling element 54 is designed as a transverse strut which is fastened pivotably at the first end region thereof to the supporting structure 6 and is fastened pivotably at the second end region thereof to the lower end region of the first carrying structure 2.

The seat arrangement 1 can be transferred from the use setting into the storage setting shown in FIG. 11 as follows. First of all, the retention of the connecting sections 52, which are assigned to the supporting structure 6, in the region of the fastening sections 53a is released. The first carrying structure 2 continues to be retained in the position illustrated in the fastening sections 53b via the connecting sections 51. The seat cushion 4 is subsequently brought by manual pivoting upward into the vertical alignment (shown in FIG. 11) of the seat cushion 4. When the second carrying structure 5 is pivoted, the above-described arrangement of the coupling element 54 at the same time causes the supporting structure 6 to be pivoted upward in a forcibly guided manner. In the storage setting shown in FIG. 11, it is apparent that the supporting struts of the supporting structure are aligned vertically and bear against the vertically aligned second carrying structure 5.

FIG. 12 shows, in a perspective illustration, a seat arrangement 50 of the second seat row in the storage setting and a seat arrangement 51, which is arranged therebehind, of the third seat row in the storage setting. To enlarge the luggage compartment, the retention of the connecting section 51 of the first carrying structure 2 in the fastening section 53b is likewise released. After removal of the seat arrangement, the folded seat arrangement 51 of the third seat row is retained again in the fastening section 53a via the connecting section 51.

Instead of the above-described connecting sections with locking/unlocking means, the sliding or guide elements described with respect to the other embodiments may also be arranged. The seat arrangement may therefore be connected releasably and removably in guide rails on the floor of the motor vehicle.

FIGS. 13-16 show a seat arrangement with a safety device which permits use of a folded seat only after the supporting structure 6, which has been previously released from the fastening sections 53a, is securely retained. The structural design of the seat arrangement substantially corresponds to the design described in relation to FIGS. 10-12. In contrast to the seat arrangement according to FIGS. 10-12, the second carrying structure 5 and the seat cushion 4 are designed as separate components. The second carrying structure 5 is fastened pivotably to the backrest 3. Said pivotable connection exists in particular between a point of the carrying structure 5, which point is located in the rear or central region, and on side members 7 connected to the first carrying structure 2. The seat cushion 4 rests on the second carrying structure and is pivotable toward the backrest 3 about the same axis.

In order for the second carrying structure to be automatically pivoted upward after the locking of the connecting sections 52 to the fastening sections 53a has been released, a prestressed spring element 61 is provided. Said spring element 61 is designed, for example, as a gas-filled compression spring and is connected in an articulated manner by the first end region, which is connected to a cylinder housing, to the lower end region of the first carrying structure 2. The piston rod which is connected to a piston from the gas-filled compression spring and is guided out of the cylinder housing is connected in an articulated manner by the free end region thereof to the first end region of the supporting struts of the supporting structure 6.

The safety device consists in that the seat cushion 4 is not connected fixedly to the frame but rather is pivotable toward the backrest about approximately the same axis. Furthermore, a locking device is provided, said locking device causing the seat cushion 4 to be locked when the supporting structure 6 is swung upward. For this purpose, a locking bolt 62 is provided in the rear side region of the seat cushion, said locking bolt engaging in locking elements, for example a lock 63, when the seat cushion is pivoted upward, and being able to bring about locking. In the embodiment shown, a lock is arranged in the region of a side member 7 only on one side. A clamping element in which a locking bolt arranged on the opposite side is releasably held is provided in the region of the second side member.

When the seat arrangement is transferred from the storage setting illustrated in FIG. 14 into the use setting shown in FIG. 16, the second carrying structure 5 is first of all swung downward in a first step. When the second carrying structure 5 is swung downward, the seat cushion first of all remains locked upright. Owing to the arrangement of the coupling element, when the second carrying structure 5 is pivoted, a forcibly guided pivoting of the supporting structure 6 is brought about at the same time. The connecting sections 52 can then be secured again on the fastening sections 53a via the locking elements.

The safety device furthermore comprises an unlocking device which causes the seat cushion 4 to be unlocked after the supporting structure 6 has been locked in the fastening section 53a. In this case, the lock 63 is unlocked via a force transmission means designed as a Bowden cable after the supporting structure 6 has been latched in the fastening section 53a. After the seat cushion 4 is unlocked, said seat cushion can be manually released from the clamping element and folded downward onto the second carrying structure.

It is ensured by the above-described safety device that no-one can sit on the seat cushion if the supporting structure is not connected correctly to the floor of the motor vehicle.

Figure 19:
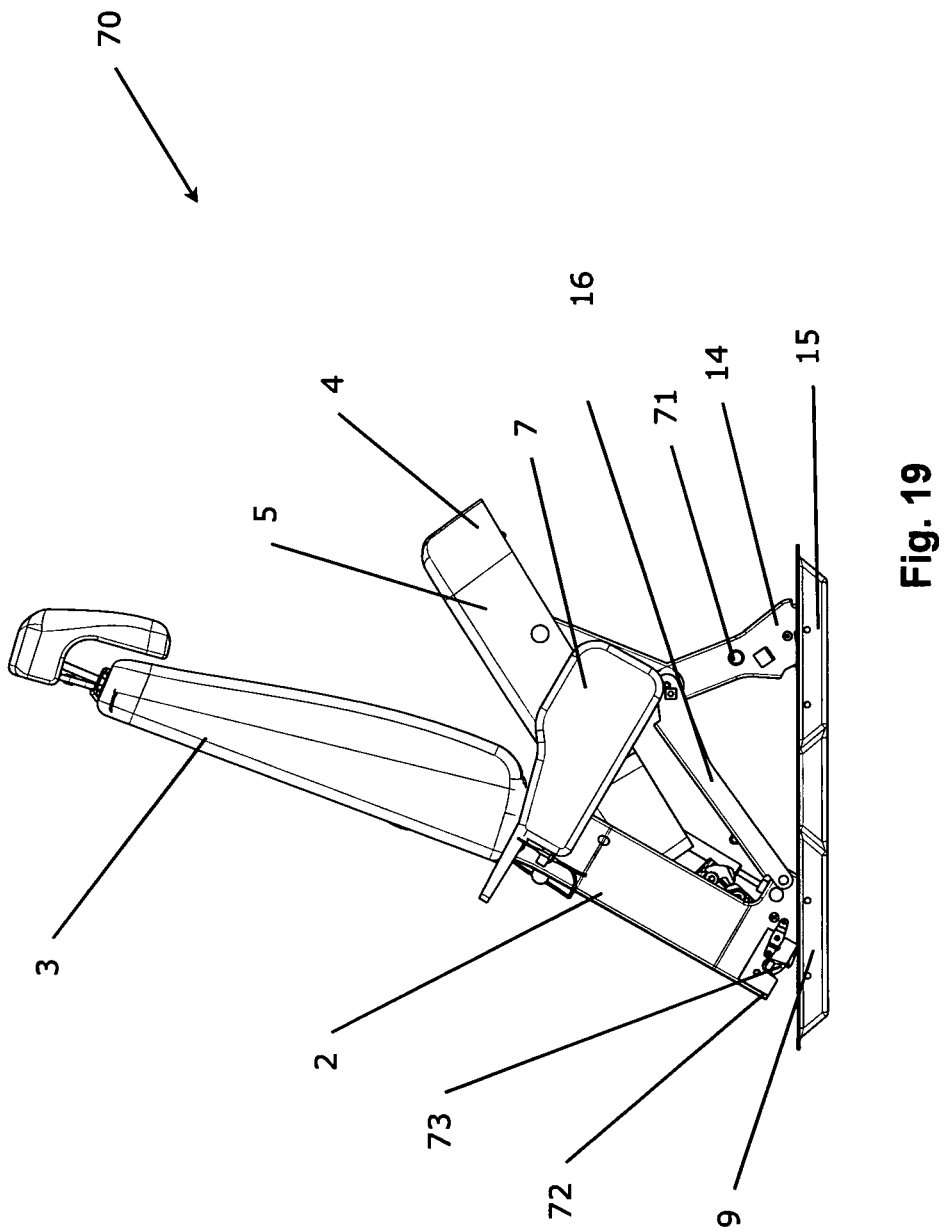
FIG. 19 shows a perspective schematic side view of the folding seat arrangement according to FIG. 17 in the entry setting.

FIGS. 17, 18 and 19 show a further refinement of an embodiment of a folding seat arrangement 70 in different settings. The folding seat arrangement 70 comprises a first carrying structure 2 with a backrest arranged thereon, a seat cushion 4 with seat upholstery and an associated second carrying structure 5, and a floor support which comprises a supporting structure 71.

The second carrying structure 5 assigned to the seat cushion 4 extends essentially within the seat cushion 4 and gives the latter the stability required for use. The first carrying structure 2 is assigned to the backrest 3 in order to carry and mechanically stiffen the backrest upholstery. The second carrying structure 5 together with the seat cushion 4 is fastened pivotably in the rear region to the backrest 3. In the embodiment shown, said pivotable articulated connection exists in particular between a point of the above-described second carrying structure 5, which point is located in the rear region or in the central region, and on side members 7 connected to the first carrying structure 2. In the present case, the side members 7 are designed as plate-like elements which are fastened laterally to the first carrying structure 2.

Furthermore, a locking device is provided which can bring about locking of the seat cushion 4 in the use setting. For this purpose, a lock is arranged in the rear side region of the seat cushion 4, said lock engaging in associated locking bolts when the seat cushion 4 is pivoted from the storage setting or from the entry setting into the use setting, and being able to bring about locking. Known unlocking means are provided to undo the locking.

The first carrying structure 2 continues downward beyond the backrest 3 and essentially consists of supporting struts which are arranged at a distance in the transverse direction, run parallel and extend in the plane of the backrest 3. At the lower end region, the supporting struts each have a connecting part 72 for connection to an associated connecting part 9 on the vehicle floor. The connection is configured in such a manner that pivoting of the first carrying structure is possible. A connection of this type is not illustrated specifically graphically and is known in general. In the use setting illustrated in FIG. 17, the connection between the first connecting part 72 and the associated connecting part 9 on the vehicle floor can be blocked in relation to the designated pivoting by means of a rotary catch 73. In this case, the rotary catch 73 may comprise locking and unlocking elements. The locking and unlocking means are preferably designed as locks which comprise a rotary latch and an associated pawl arrangement. The releasable locking of the first carrying structure 2 in relation to pivoting is produced in a known manner by interaction of a locking latch, which is arranged on the first connecting part 72, with a locking member, namely a transverse bolt, arranged on the connecting part 9 on the vehicle floor.

The supporting structure 71 consists of two toggle joint arrangements which are arranged at a distance in the transverse direction and run parallel to each other. The toggle joint arrangements are expediently aligned at approximately a right angle or with a slight inclination in relation to the plane of the bearing surface of the seat cushion 4. The toggle joint arrangement comprises two articulated levers 74, 75 which are connected to each other at the mutually facing end regions thereof via a buckling joint 76. The buckling joint 76 permits pivoting of the two articulated levers 74, 75 into an angled arrangement. Furthermore, a pivoting catch is provided in the region of the buckling joint 76 and can be used to block pivoting of the articulated levers 74, 75.

The first articulated lever 74 is coupled pivotably at the end region thereof which lies opposite the buckling joint 76 to the second carrying structure 5 via an articulated arrangement 12. In the embodiment shown, said pivotable connection is arranged in particular in the front end region of the second carrying structure 5 and a first end region of the toggle joint arrangement. The second articulated lever 75 is secured releasably at the end region thereof which lies opposite the buckling joint 76 on a connecting part 15 on the vehicle floor via a second connecting part 14. In this case, the connecting part comprises locking and unlocking means. The releasable locking of the supporting structure 71 is produced by interaction of a locking latch, which is arranged on the connecting part 14, with a locking member, namely a transverse bolt, arranged on the connecting part 15 on the vehicle floor. Of course, other locking means/unlocking means may also be provided.

It is apparent from FIGS. 17-19 that a coupling element 16 is additionally provided. Said coupling element 16 is designed as a transverse strut which is connected in an articulated manner by the first end region thereof to the supporting structure 71 and is connected in an articulated manner by the second end region thereof to the first connecting part 72 of the first carrying structure 2. In this case, the pivot axis of the buckling joint 76 coincides with the articulated connection of the coupling element 16.

The above-described articulated connections between the first carrying structure 2 and the second carrying structure 5, the second carrying structure 5 and the first articulated lever 74, the first articulated lever 74 and the coupling element 16, and the coupling element 16 and the first carrying structure 2 form a virtually parallel, double-jointed connection between the first carrying structure 2 and the first articulated lever 74. In the present case, the double-jointed connection is referred to as virtually parallel because a genuinely parallel movement on a segment of a circular arc or a movement on a segment of a circular arc together with an additional rotational movement which is more or less clearly distinct is produced as a function of the lever length ratio and the distances between the joints. If, in the particular case, the levers formed by the second carrying structure 5 and the coupling element 16 are exactly equal in length and parallel, during the pivoting of the second carrying structure together with the seat cushion 4, an approximately parallel movement of the first articulated lever 74 on a segment of a circular arc is produced. In the event of deviations of the lever lengths from one another or in the event of different distances between the joints, the first articulated lever 74 then moves differently on a segment of a circular arc, the movement comprising pivoting.

The seat arrangement 70 can be transferred from the use setting to the storage setting shown in FIG. 18 as follows. First of all, the retention of the second connecting part 14 on the associated connecting part 15 on the vehicle floor and the locking of the seat cushion to the first carrying structure 2 are released. The first carrying structure 2 continues to remain secured in the position illustrated on the connecting part 9 of the vehicle floor via the first connecting part 72 and continues to remain blocked with respect to pivoting. The seat cushion 4 is subsequently brought by manual pivoting upward into the vertical alignment (shown in FIG. 18) of the seat Cushion 4. When the second carrying structure 5 is pivoted, the above-described arrangement of the coupling element 16 simultaneously brings about a forcibly guided pivoting upward of the supporting structure 71. The buckling joint 76 likewise remains in a blocked setting. In order for the second carrying structure 5 to be automatically pivoted upward after the locking is released, a spring means 18 is provided which prestresses the second carrying structure 5 toward the stored position. In the present case, said spring means 18 is designed, for example, as a gas-filled compression spring and is connected in an articulated manner by the first end region thereof, which is connected to a cylinder housing, to the second carrying structure 5. The piston rod which is connected to a piston from the gas-filled compression spring 18 and is guided out of the cylinder housing is connected in an articulated manner by the free end region thereof to the first connecting part 72.

It is apparent from the storage setting shown in FIG. 18 that the toggle joint arrangements of the supporting structure 71 are aligned vertically and bear against the vertically aligned second carrying structure 5.

To enlarge the luggage compartment, the folded seat arrangement 70 can now be removed from the vehicle interior. For this purpose, the connection of the first carrying structure 2 via the first connecting part 72 to the connecting part 9 on the vehicle floor is designed to be releasable.

The above-described connecting parts may also comprise sliding or guide elements. The seat arrangement 70 can therefore be connected in a releasable and removable manner and in a displaceable manner in guide rails arranged on the vehicle floor.

FIG. 19 shows the above-described seat arrangement 70 in an entry setting. In said position, the first carrying structure 2 is pivoted forward about the pivot axis in the region of the connecting point of the first connecting part 72 to the associated connecting part 9 on the vehicle floor. In this position, easier access to the rear seats in the vehicle interior is possible.

Transfer from the use setting shown in FIG. 17 into the entry setting shown in FIG. 19 can be obtained by release of the rotary catch 73 in the region of the first connecting part 72, release of the locking of the seat cushion 4 to the first carrying structure 2 and release of the buckling joint 76. After the rotary catch has been undone and the locking of the buckling joint has been undone, the first carrying structure 2 can be pivoted forward. At the same time, pivoting of the two articulated levers 74, 75 into an angled arrangement is obtained by means of the buckling joint 76. By means of the above-described, virtually parallel, double-jointed arrangement, when the first carrying structure is pivoted forward the connecting point of the supporting structure 71 to the second carrying structure 5 is displaced forward at the same time.

The alternative embodiment (shown in FIGS. 20 and 21) of a folding seat arrangement 80 in the different settings differs from the embodiment described with respect to FIGS. 17, 18 and 19 by means of the configuration of the coupling element 21, the supporting structure 71 and the connection of the supporting structure 71 to the associated connecting part on the vehicle floor via the second connecting part.

In the embodiment illustrated in FIGS. 20 and 21, the supporting structure 81 comprises two supporting struts 82 which are arranged at a distance in the transverse direction and run parallel to each other. The supporting struts 82 are coupled pivotably at the first end region thereof to the second carrying structure 5 via an articulated arrangement 12. In the embodiment shown, said pivotable connection is arranged in particular in the region upstream of the pivotable connection between the seat cushion and backrest on the second carrying structure 5 and the first end region of the supporting strut 82. The second end region of the supporting struts 82 is connected pivotably to a connecting part 84 on the vehicle floor via a second connecting part 83, via a pivoting joint.

The above-described connecting parts 14, 15, 83, 84 may also comprise sliding or guide elements. The seat arrangement can therefore be connected releasably and removably and in a displaceable manner in guide rails arranged on the vehicle floor.

In the alternative embodiment, the coupling element 85 is configured as a gas-filled compression spring which is connected in an articulated manner by the first end region thereof, which is connected to a cylinder housing, to the first connecting part 72. The piston rod which is connected to a piston from the gas-filled compression spring and is guided out of the cylinder housing is connected in an articulated manner by the free end region thereof to the supporting strut 82. In the use setting, the gas-filled compression spring 85 is prestressed with respect to an increase in the distance between the connecting points. Furthermore, the coupling element 85, i.e. the gas-filled compression spring in the present case, is designed to be lockable. As a result, in the locked situation, a predetermined distance can be forced between the connecting points.

The coupling element 85 may also be any other known component which permits an increase in the distance between the connecting points.

Transfer from the use setting shown in FIG. 20 into the entry setting shown in FIG. 21 can be obtained by release of the rotary catch 73 in the region of the first connecting part 72, release of the locking of the seat cushion 4 to the first carrying structure 2 and release of the locking of the coupling element 85. After the locks have been undone, the first carrying structure 2 can be pivoted forward into the position shown in FIG. 21. When the first carrying structure is pivoted, pivoting of the supporting structure about the pivot axis of the articulated arrangement, the pivot axis running in the transverse direction, is brought about at the same time. Said pivoting movement is assisted by the prestressed gas-filled compression spring which also compensates for the increase in the distance between the connecting points.

The carrying structures and the supporting structures of the above-described folding seat arrangement are preferably designed in the manner of a frame or framework. The possibility of advantageous production arises with the use of suitably bent metal tubes which are connected to one another and to adjoining fittings, in particular joints and locks, via bushings or welds.

A core consisting of a foamed elastic plastics material, such as, for example, polyurethane, which is provided with a durable cover made of fabric material, or synthetic or natural leather, is customarily provided as the upholstery for the above-described folding seat arrangement.

For a folding seat arrangement with an individual seat, two edge supporting struts are preferably provided on the seat cushion in the rear and front end regions of the seat cushion. In the case of a folding seat arrangement having a plurality of seats, further supporting struts running parallel and located in between are preferably provided in order to avoid sagging of the seat cushion.

The invention claimed is:

1. A folding seat assembly for a motor vehicle comprising:
a first carrying structure (2) for supporting a backrest (3) spaced above a floor of the motor vehicle;
a first connecting section (51) for releasable securing the first carrying structure (2) and backrest (3) to the floor of the motor vehicle;
a second carrying structure (5) pivotably coupled to the first carrying structure (2) for supporting a seat cushion (4), the seat cushion pivotal between a use position spaced above and generally parallel to the floor and a storage position pivoted upwardly and lying flat against the backrest;
a supporting structure (6) pivotally coupled to the second carrying structure (5) for supporting the second carrying structure (5) and seat cushion (4) in the use position spaced above the floor of the motor vehicle;
a second connecting section (52) or releasably securing the supporting structure (6) to the floor of the motor vehicle; and
characterized by a coupling element (54) extending between a first end pivotally coupled to said supporting structure and an opposite second end pivotally coupled to said first carrying structure wherein said coupling element automatically pivots the supporting structure between a support position extending between the seat cushion and the floor and a folded position folded flat against the seat cushion in response to pivotal movement of the seat cushion from the use position to the storage position.

2. The folding seat arrangement according to claim 1, wherein a prestressed spring element (61) is fastened in an articulated manner by a first end region thereof to the first carrying structure (2) and is fastened in an articulated manner by a second end region thereof to the supporting structure or the second carrying structure (5) in order to cause the second carrying structure (5) to automatically pivot upward when the supporting structure (6) is released from the fastening sections (53a).

3. The folding seat arrangement according to claim 2, wherein the seat cushion (4) rests on the carrying structure (5) and is fastened pivotably in relation to the first carrying structure (2), and wherein a locking device is furthermore provided, for the releasable securing of the seat cushion on the first carrying structure (2) in the storage position, and an unlocking device which interacts with the locking device (62, 63) in such a manner that the locking of the seat cushion (4) is released only after the supporting structure (6) is secured in a fastening section (53a), and wherein the locking device preferably comprises a locking bolt (62) which is arranged on the seat cushion (4) and engages in a lock receptacle of a lock (63) arranged on the first carrying structure (2), and wherein the unlocking device comprises preferably a Bowden cable.

4. The folding seat arrangement according to claim 3, wherein a further locking bolt (62) is arranged on the seat cushion (4), said locking bolt, in the storage position, being held in a clamping element arranged on the first carrying structure (2).

5. The folding seat arrangement according to claim 1 further including a pair of side members (7) fixedly secured to the first carrying structure (2) for pivotally supporting the second carrying structure (5).

6. The folding seat arrangement according to claim 5 further including first and second fastening sections (53a, 53b) coupled to the first and second connecting sections (51, 52), respectively, for selectively locking and unlocking the connecting sections to the floor of the vehicle.

* * * * *